United States Patent [19]

Clay et al.

[11] Patent Number: 4,474,706

[45] Date of Patent: Oct. 2, 1984

[54] PROCESS FOR THE PREPARATION OF ORGANOPHILIC CLAYS

[75] Inventors: Hughie M. Clay, Independence, Kans.; Michael Frozzitta, Fords, N.J.; Alan L. Brotherton, Coffeyville, Kans.

[73] Assignee: The Sherwin-Williams Company, Cleveland, Ohio

[21] Appl. No.: 510,720

[22] Filed: Jul. 5, 1983

Related U.S. Application Data

[63] Continuation-in-part of Ser. No. 413,209, Aug. 30, 1982, which is a continuation-in-part of Ser. No. 331,707, Dec. 17, 1981, abandoned.

[51] Int. Cl.$^3$ .............................................. C07F 5/06
[52] U.S. Cl. ................................................. 260/448 C
[58] Field of Search ...................................... 260/448 C

[56] References Cited

U.S. PATENT DOCUMENTS

| | | | |
|---|---|---|---|
| 2,531,427 | 11/1950 | Hauser | 260/448 |
| 2,531,812 | 11/1950 | Hauser | 252/815 |
| 2,531,825 | 3/1950 | Peterson et al. | 260/448 C X |
| 2,767,177 | 10/1956 | Erickson | 260/448 C X |
| 2,859,234 | 11/1958 | Clem | 260/448 C |
| 2,951,087 | 8/1960 | Hauser et al. | 260/448 C |
| 2,966,506 | 12/1960 | Jordan | 260/448 |
| 2,971,922 | 2/1961 | Clem | 252/316 |
| 3,012,050 | 12/1961 | Fox et al. | 260/448 C |
| 3,350,429 | 10/1967 | Hasegawa et al. | 260/448 C X |
| 4,105,578 | 8/1978 | Finlayson et al. | 252/316 |
| 4,193,806 | 3/1980 | Finlayson | 106/20 |
| 4,287,086 | 9/1981 | Finlayson et al. | 252/316 |
| 4,402,881 | 9/1983 | Alther | 260/448 C |

*Primary Examiner*—Helen M. S. Sneed
*Attorney, Agent, or Firm*—James V. Tura; Robert E. McDonald

[57] ABSTRACT

Disclosed is a dry process for the production of an organophilic clay for use in the thickening of fluids such as oil base drilling muds, paints, lubricants and the like. The process comprises adding a mixture of melted organic ammonium salts to a dry clay in a blending apparatus and vigorously blending the materials to react by ion exchange to form the organophilic ammonium salts of the clay.

4 Claims, No Drawings

PROCESS FOR THE PREPARATION OF ORGANOPHILIC CLAYS

This application is a continuation-in-part of Ser. No. 413,209 filed on Aug. 30, 1982, which in turn is a continuation-in-part of application Ser. No. 331,707 filed on Dec. 17, 1981, now abandoned.

This invention relates to the preparation of organophilic clays useful as thickeners for various fluids and more particularly to a dry process for the manufacture of organophilic clays useful as thixotropic viscosifying agents in mineral oils and particularly oil-based drilling muds or fluids, paints, lubricants and the like.

BACKGROUND

Organophilic clays have been known as jelling or thickening agents for various fluids such as mineral oils and are particularly useful for thickening oils in the preparation of lubricants such as grease and the like. More specifically, U.S. Pat. Nos. 2,531,427; 2,531,812; and 2,966,506 describe clays that have been modified with organic compounds as thickener for organic fluids. Generally, the process for manufacturing organophilic clays includes adding an onium base, e.g. ammonium, phosphonium, sulfonium, arsonium, stibonium, oxonium, etc. to water slurries of swellable clays causing the onium base to react with the clay to form the organophilic clay product.

In earth boring operations, the use of rotary drilling equipment requires the addition of drilling fluids or muds. These drilling fluids are either made from clays obtainable at the well site or by the addition of hydrophillic colloids of which amine-modified bentonite is the most common. In addition to the organophilic clays, certain other additives including polymers have been used as thickeners for fluids used in the drilling of oil wells. The oil-based drilling muds may be employed where the external or continuous phase of the mud is oil instead of water. The oil-based drilling fluids are useful particularly where drilling is in oil or gas bearing stratum because the oil-based muds will not "drown out" the oil or gas as in the case of a water-based drilling fluid. It is also advantageous to employ an oil-based fluid in drilling through shale formations which are subject to hydration by water. The external phase of the oil-based fluids may include various oils such as petroleum or crude oil distillates, coal tar distillate or residue and other oils such kerosenes, fuel oil, diesel oils and the like.

Organophilic clays made by the aqueous slurry process are useful as thickeners in paints, as well as in mineral oils for the preparation of greases and the like. However, the performance parameters needed for the preparation of these compositions are more critical and require a higher degree of purity of material. The aqueous slurry process provides a grit-free, salt-free product due to the centerfusing, washing and subsequent drying utilized in the processes. The purity of the organophilic clays are less critical, however, where the modified clays are to be used in drilling muds.

Further, the water slurry process also requires dispersing and hydrating the treated clay in deionized or salt free water. The dispersed clay must be stored in order to maintain its hydration and centerfuged to remove any grit remaining in the clay.

The organophilic compound, e.g. quaternary ammonium salts are added to the aqueous dispersion of clay at temperatures ranging from 100° F. to 120° F. The exact quantities of clay and quaternary ammonium salt needed for reaction must be calculated in order to obtain a completely modified clay product. Finally, it is essential that when using the aqueous process the product must be filtered in a filter cake which may contain up to about 80% water, and dried in a stream of warm air. At this point the modified clay may be ground to the desired commercial mesh size and used for a variety of purposes.

SUMMARY

The non-aqueous or dry process of this invention is unique in that it provides for reacting the substantially dry colloidal clay with at least one organic ammonium salt, e.g. a mixture of organic quaternary ammonium compounds such as a mixture of dimethyl dihydrogenated tallow ammonium chloride and methyl benzyl dihydrogenated tallow ammonium chloride, in the dry state, to produce an organophilic clay or modified clay useful as a thickener for drilling muds and particularly muds which comprise oils. In accordance with this invention, the process provides a substantially water-free method of producing organophilic clays and avoids all of the problems associated with utilizing large amounts of water in the aqueous slurry process. Specifically, the substantially dry colloidal clay is charged to a blending apparatus or mixture and blended and thoroughly mixed with about 15% to 55% by weight of the dry clay of at least one and preferrably more than one organic ammonium salt and more preferably with a mixture of at least two organic ammonium salts. For example, it is preferred to prepare the modified organophilic clay products from quaternary salts by using a mixture of dimethyl dihydrogenated tallow ammonium chloride and methyl benzyl dihydrogenated tallow ammonium chloride, wherein the methyl benzyl dihydrogenated tallow ammonium chloride ranges from about 10 to 60 mole percent of the mixture. The quaternary ammonium salts may be added individually or as a mixture in any sequence to the dry clay at a temperature at least above the melting point of the ammonium salts to obtain the organic modified clay product.

More specifically, at least one of the organic ammonium salts and preferrably a mixture of the organic ammonium salts and the dry clay are vigorously blended and thoroughly mixed in the apparatus at increased temperatures, e.g. temperatures ranging up to 60° C. or higher, causing the clay to react with the quaternary ammonium salts, by ion exchange, resulting in the organic modified clay products. It is essential that the dry reaction take place at temperatures ranging up to 60° C. or higher, depending on the melting points of the quaternary ammonium salts being utilized in the reaction and at least at temperatures in excess of the highest melting point of either of the quaternary ammonium salts comprising the mixture to insure a complete reaction of the salts with the dry clay.

The modified clay, e.g. amine modified, obtained from this dry process may be subsequently washed in water to remove any salts and heated to obtain a substantially dry organophilic or amine modified clay. The product can be ground to a commercial size, e.g. approximately 200 mesh and utilized in oilbased drilling fluids.

Thus, it is an object of this invention to provide a dry process wherein organic modified clays are produced by reacting dry clay with an organic ammonium salts under dry conditions to obtain a substantially water-free, organo-modified clay. The dry process avoids the problems and cost inherent in filtering and drying clays obtained from the water-slurry processes. It is another object of invention to eliminate a number of procedures needed heretofore to obtain organophilic clays by reacting the clay with the organic compounds without the water required heretofore.

DETAILED DESCRIPTION OF THE INVENTION

Clays useful in the practice of this invention are clays that have a substantial base-exchange capacity and whose cations are relatively easily replaced. A particularly desirable clay, from which organophilic clay may be prepared, is the Wyoming variety of swelling bentonites. These clays exhibit a base exchange capacity ranging from about 60 to 100 milliequivalents (meq) of exchangeable base per 100 grams of clay. These base exchange values were determined by the ammonium acetate method. A typical naturally occuring Wyoming bentonite may have approximately 50% of its base exchange capacity satisfied by sodium ions with the remainder of its exchangeable ions being calcium, magnesium and potassium with the major portion being calcium. Because sodium ions commonly constitute a sizeable fraction of the exchangeable metallic ions in a naturally occuring bentonite clay, it has been a wide-spread practice to refer to such clays as sodium bentonite even though a substantial portion of the exchangeable ions, perhaps 50% or more, are ions other than sodium. In addition to the clays mentioned above, other clays such as attapulgite, nectorite, nontrionite, illite, saponite, zeolite, fuller's earth and mixtures thereof are useful in the practice of this invention. All of these clays are characterized by an unbalanced crystal lattice and believed to have negative charges which are normally neutralized in their natural state by inorganic metal ions which, to varying degrees, are capable of being replaced by other inorganic ions or organic radicals.

Organic ammonium salts which readily undergo base exchange reaction with the clays include, for example, the primary, secondary, tertiary and quaternary ammonium salts. Some preferred ammonium salts contain at least one carbon chain of 12 or more carbon atoms. Thus, the cation of the salt or mixtures thereof used to react with the clay includes radicals such as dodecylammonium, octadecylammonium, didodecylammonium, dihexadecylammonium, tetradecylbenzylammonium, methyldioctadecylammonium, dibenzyldodecylammonium, dimethyldioctadecylammonium, methylbenzyldihexadecylammonium, etc. A particulary preferred mixture of salts consist of the dimethyl dihydrogenated tallow ammonium and methyl benzyl dihydrogenated tallow ammonium salts in various ratios. It is particularly preferred that the mixture have a ratio wherein the methyl benzyl dihydrogenated tallow ammonium salt is present in an amount ranging from 10 to 60 mole percent.

The process of this invention requires vigorous, intimate contact of the reactants i.e. the clay and the ammonium salt to achieve a reasonably complete reaction product. The reactants are mixed or blended at elevated temperatures, e.g. temperatures ranging up to 60° C. or higher, so that the ammonium salt is in liquid form and mixing of the reactants is rigorous. It has been found, for example, that even on a laboratory scale a useful product can be obtained by using a mortar and pestal. On an industrial scale, any of several blending apparatus may be used such as a blender, e.g. a ribbon blender or extruder, etc. to achieve an acceptable product. The preferred blending apparatus which achieves proper intimate contact with a minimum amount of processing time and results in an easily grindable, dry product is a muller. A muller works substantially on the principal of a mortar and pestal in which rotating surfaces crush and squeeze the product against the walls and/or floor of the muller reaction vessel. There is some heating of the reaction mixture and product due to friction and compression within the system which is not detrimental to the processing of the clay. In fact, the heat assists in the removal of entrained water and solvents which may be present in both the ammonium salt and the clay. In accordance with a further aspect of the invention, the reaction chamber of the reactor may include an air flow system to assist in the removal of volatile fluids.

The following examples illustrate the preparation and use of organophilic clays in accordance with this invention. It is understood that these examples are illustrations and should not be considered as a limitation upon the materials or process steps which may be incorporated as part of the invention.

EXAMPLE I

About one hundred pounds of Wyoming bentonite is charged to the reaction chamber of a muller and mulling and agitation is begun. To the rotating mixture, 40 to 70 pounds of a quaternary ammonium chloride, i.e. dimethyl dihydrogenated tallow ammonium chloride is added at a temperature of about 60° C. (the temperature being sufficient to melt the quaternary ammonium salt) over a period of about 5–30 minutes. The reaction mixture is stirred and mulled for an additional 10 to 30 minutes following the addition of the ammonium salt. The mixture initially becomes lumpy and the lumps are gradually broken up and reduced in size during the mulling process. The material is then removed from the reaction vessel, in a dry state, and ground to commercial size (200 mesh) for use in thickening oil-based drilling fluids.

EXAMPLE II

The organophilic clay made in accordance with the procedures set forth in Example I was compared in an oil-based drilling mud system with other, commercial organophilic clays made by prior art (water slurry) processes to determine the performance of the dry process material. Each of these materials was tested in a proprietary drilling fluid formulation known as the Aspha-Mul drilling fluid system. To formulate a 65/35 oil to water ratio drilling fluid and make 100 barrels of mud, fifth-six (56) barrels of diesel oil was added to a mixing tank. To the diesel oil was added ten pounds per barrel (ppb) of Aspha-Mull TM concentrate, five pounds per barrel EW-20 emulsifier, eight pounds per barrel MC-500 filtration control agent and ten pounds per barrel CaO. Thirty barrels of 10 lbs./gal. sodium chloride brine was then added to the circulating mixture and 147 sacks (100 lbs./sack) of barite weighting agent was then added to the fluid mixture. The organophilic clays to be tested were then added in the amount of about 2 ppb with the results of the testing, i.e. properties of the fluid shown in Table I.

TABLE I

|  | DRY PROCESS CLAY | Comp A | Comp B | Comp C | Comp D | Comp E |
|---|---|---|---|---|---|---|
| App. Vis | 19 | 18.5 | 18.5 | 18.5 | 20.5 | 18 |
| 600 | 38 | 37 | 39 | 37 | 41 | 36 |
| 300 | 22 | 21 | 22 | 20 | 22 | 20 |
| PV | 16 | 16 | 17 | 17 | 19 | 16 |
| YP | 6 | 5 | 5 | 3 | 3 | 4 |
| Emul. Stab. | 236 | 190 | 159 | 144 | 384 | 82 |

In Table I, the "Dry Process Clay" material is the material of this invention and compositions A through E represent commercial, prior art materials. In Table I, the apparent viscosity (App. Vis.) is well within experimental limits as is the Fann viscosity at six hundred (600) and three hundred (300) rpm. The plastic viscosity (PV) and the yield point (YP) are all comparable, a yield point in the range of 4–8 being considered optimum. The emulsion stability (EMUL STAB) is a measure of the electrical resistance of the fluid, with a value of 200 or above being preferred. If the emulsion stability is low, the emulsion will break down and the fluid will lose its performance values. Finally, the high temperature, high pressure fluid loss (HTHP FL) was measured for each fluid, a low filtration rate being reflective of good performance of the organophilic clay. It can be seen from Table I that the organophilic clay of this invention falls well within the performance parameters of the prior art, wet slurry process materials.

EXAMPLE III

The dry organophilic clay product of Example I was washed thoroughly in water and filtered. The organophilic clay is hydrophobic and the clay filter cake comprise less than 30% water. The filter cake was dried and ground to produce a chloride free, paint grade organophilic clay at much less cost than prior art slurry processes in which up to 70–80% water must be removed.

To further illustrate the difference between the organophilic clays prepared by the dry process of this invention and the modified clays derived from aqueous systems, the following data were established. It is known that the crystal structure of most clays are composed of layers where each layer consists of firmly bonded network of Si—O tetrahedra and Al—O octahedra. The forces holding the layers are generally weak, therefore, cations, water and organic molecules can be introduced into the spacing between the layers. The layers may or may not be neutral depending on whether isomorphous substitution of atoms has taken place such as magnesium replacing aluminum, etc. The raw bentonite clays (Samples 1, 7 and 10 of Table II) are sodium montmorillonite which has an orthorhombic symmetry. The repeating unit (unit cell) of its crystal structure is defined by cell dimensions, a, b and c mutually perpendicular. Depending on the size of molecules absorbed on the interlayers, the unit cell dimension "c" varies drastically while the other two dimensions "a" and "b" remain in tact. In terms of X-ray diffraction experiments, the positions of the basal reflections change accordingly, while the positions of the general reflections stay the same. The unit cell dimensions "a", "b" and "c" can be derived from the X-ray diffraction patterns of the clays.

By experimentation, X-ray diffraction analysis was run for each of the 11 samples set forth in Table II. In order to be positive with respect to identification and confirmation, a portion of each raw clay (samples 1, 7 and 10) was dried at 120° C. for two hours, another portion of each raw clay was wetted with glycerol. X-ray diffraction analysis was also run for these samples of raw clays. In order to measure the d-spacings accurately at very low angles, the (110) peak of sodium tartrate at d=9.05 A° was used as an internal standard. Comprehensive analysis of the X-ray diffraction patterns of all the clay samples indicates that the three raw clays (samples 1, 7 and 10) are essentially the same clean montmorillorite with very minor quartz contamination. The strong quartz reflection at d=3.343 A° was used as a calibration reference for instrumental error. The unit cell dimensions and other derived data are listed in the Table. It should be noted that the basal plane spacing "c" is the repeating distance between layers of the clay structure, the clearance space "delta" is the space between layers occupied by the intruding molecules, e.g. water, glycerol and dimethyl dihydrogenated tallow ammonium cations. The expansion "X" is the increase in space between layers relative to that of the starting raw clay.

TABLE II

X-RAY DATA ON ORGANOPHILIC CLAYS

| Clay Sample | Unit Cell Data, Å | | | | |
|---|---|---|---|---|---|
|  | a | b | c | t | X |
| 1. Raw clay, untreated bentonite, CG-SW from Federal Bentonite | 5.18 | 8.97 | 12.4 | 2.8 | 0 |
| 2. Organophilic clay, dry process, Humko Q9702C added | 5.18 | 8.97 | 35.3 | 25.7 | 22.9 |
| 3. Organophilic clay, dry process, washed to remove ions | 5.18 | 8.97 | 30.4 | 20.8 | 18.0 |
| 4. Organophilic clay, wet process, improved the hydration | 5.18 | 8.97 | 33.9 | 24.3 | 21.5 |
| 5. Organophilic clay, wet process, Southern Clay, Clayton Mud VG-02 | 5.18 | 8.97 | 29.4 | 19.8 | 17.0 |
| 6. Organophilic Clay, wet process, Accofloc 350 and Armak 2HT-75 | 5.18 | 8.97 | 29.4 | 19.8 | 17.0 |
| 7. Raw Clay, Untreated bentonite, Accofloc 350 from Am Colloid | 5.18 | 8.97 | 12.4 | 2.8 | 0 |
| 8. Organophilic Clay National Lead's Geltone II | 5.18 | 8.97 | 35.3 | 25.7 | 22.9 |

TABLE II-continued
X-RAY DATA ON ORGANOPHILIC CLAYS

| Clay Sample | Unit Cell Data, Å | | | | |
| --- | --- | --- | --- | --- | --- |
| | a | b | c | t | X |
| 9. Organophilic Clay, wet process, National Lead's Betonite 34 | 5.18 | 8.97 | 28.5 | 18.9 | 16.1 |
| 10. Raw Clay, untreated bentonite, Wyo Jel 1019 from Federal Bentonite | 5.18 | 8.97 | 12.4 | 2.8 | 0 |
| 11. Organophilic Clay, dry process, Humko Q972C and Wyo Jel 1019 | 5.18 | 8.97 | 32.7 | 23.1 | 20.3 |
| 12. Raw Clay #1, #7 & #10, dried at 120° C., 2 hrs. | 5.18 | 8.97 | 9.60 | 0 | −2.8 |
| 13. Raw Clay #1, #7 & #10, wetted with Glycerol | 5.18 | 8.97 | 18.0 | 8.4 | 5.6 |

It should be noted from the data in Table II that the starting raw clays (samples 1, 7 and 10) are typical sodium montmorillorites with a monomolecular sheet of water between layers in their crystal structure. The thickness of the layers is 12.4 A°. It contracts to 9.60 A° on dehydration and expands to 18.0 A° when wetted with glycerol, which is a typical behavior for sodium montmorillorite.

The dimensions of the unit cell (repeating unit of crystal structure) remained constant, a=5.18 A° and b=8.97 A° displaying the strong Si—O and Al—O bonds. However, the third dimension, "c" changes due to weak Van der Waal bond. The "c" dimension is a direct measure of layer separation (perpendicular distance between layers) which varies between 9.6 A° and 35.3 A° depending on the size of the molecules sandwiched between the layers namely:

c=9.6 for dried clay
c=12.4 for raw clay
c=18.0 for glycerol clay
c=28.5-35.3 for organophilic clays The layer separation in the organophilic clays obtained by the dry process (samples 2, 3, 4, 8 and 11: c is greater than 30 A°) appears to be slightly larger than that of the wet process (samples 5, 6 and 9: c is less than 30°) according to the data in the Table II.

In terms of crystal structure and layer separation, the organophilic clays made in accordance with this invention are equal or better than other organophilic clays obtained from aqueous reaction systems. More specifically the dimethyl dihydrogenated tallow ammonium cations, e.g. the chlorides, are successfully introduced into the crystal structure (between layers) and not just on the surface of the clay particles.

It can be seen that using the above process, a lubricating grade organophilic clay may also be produced by the process of this invention. This invention provides a dry process for the production of organophilic clay which eliminates many of the labor and cost intensive steps of prior art water slurry processing to produce organophilic clay.

While the invention has been described in the more limited aspects of a preferred embodiment thereof, other embodiments have been suggested and still others will occur to those skilled in the art upon the reading and understanding of the foregoing specifications. It is intended that all such embodiments be included within the scope of the invention as limited only by the appended claims.

The invention claimed is:

1. A process for manufacturing organophilic clays under dry conditions which comprises reacting a substantially dry swellable clay with about 15% to about 55% by weight of said clay of a mixture of dimethyl dihydrogenated tallow ammonium chloride and methyl benzyl dihydrogenated tallow ammonium chloride wherein the methyl benzyl dihydrogenated tallow ammonium chloride ranges from about 10 to 60 mole percent of the mixture; said mixture of quaternary ammonium salts being reacted with the swellable clay at temperatures above the melting point of said ammonium salts for a period sufficient to obtain the organophilic clay products and remove any liquid from the reaction.

2. The process of claim 1 further characterized in that the dry swellable clay is sodium bentonite having an exchange capacity of at least 80 milliequivalents per 100 grams.

3. The process of claim 1 further characterized in that the dry swellable clays are reacted with the mixture of organic ammonium salts at temperatures above 60° C.

4. The dry organophilic clays obtained by the process of claim 1.

* * * * *